United States Patent [19]

Gordon

[11] Patent Number: 4,940,020

[45] Date of Patent: Jul. 10, 1990

[54] ANIMAL RESTRAINING AND TRAINING DEVICE

[76] Inventor: Richard A. Gordon, 95 W. 3rd St., Freeport, N.Y. 11520

[21] Appl. No.: 233,213

[22] Filed: Aug. 17, 1988

[51] Int. Cl.⁵ ............................................. A01K 1/06
[52] U.S. Cl. ..................................... 119/106; 119/29
[58] Field of Search ................. 119/29, 96, 106, 108, 119/1, 109; 2/129, 319

[56] References Cited

U.S. PATENT DOCUMENTS

| | | | |
|---|---|---|---|
| 770,070 | 9/1904 | Johnson | 119/106 |
| 1,603,222 | 10/1926 | Transue | 119/29 |
| 2,394,144 | 2/1946 | Brose | 119/106 |
| 3,477,409 | 11/1969 | Costanzo | 119/106 |
| 4,802,482 | 2/1989 | Gonda et al. | 119/29 |

Primary Examiner—John Weiss
Attorney, Agent, or Firm—Bauer & Schaffer

[57] ABSTRACT

A molded, elongated, substantially rigid plastic strip having a plurality of protuberances disposed on one surface. The strip is bendable in an arc transverse to its length to be disposed around the neck of an animal, so that the protuberances face inward toward the animal's neck. When force is applied thereto, the device causes the animal discomfort.

9 Claims, 1 Drawing Sheet

ANIMAL RESTRAINING AND TRAINING DEVICE

BACKGROUND OF THE INVENTION

The present invention relates to an animal restaining and training device, and more particularly, to an improved animal restraining and training device particularly for dogs or other large animals which achieves its purpose in a humane manner without hurting or damaging an animal on which it is employed.

Animal restraining and training devices more commonly called choke collars are well known. Among such known choke collars, is one consisting of a chain that fits around the neck of the animal, and which has a plurality of sharp barbs or metal hooks disposed thereon which, when the animal strains or pulls on its leash cutting into its neck, alerts the animal to the contrary instructions of the trainer or owner. Such a collar actually scratches and injures the animal, as well as severely chokes the animal when force is applied to the collar. Another known type of choke collar is simply a chain having loops at one or both ends, one end of which passes trough the other to form an easily tightenable collar. This type of choke collar tends to severely choke an animal when the animal strains and pulls on his leash, since there is no limit to the degree of closing of the loop.

Moreover, both of the above described choke collars, being made of metal, are prone to rust over long periods of time and become a severe health hazard to the animal and owner. Furthermore, an animal provided with the described choke collars, can easily loose the same when a lead chain or leash is removed therefrom due to their loose fit when no force is being applied to them.

There exists, therefore, a need for an animal restraining and training devices which does not exhibit the above-mentioned disadvantages. The present invention fulfills such a need. These objects and advantages, together with others will be obvious from the following disclosure.

BRIEF STATEMENT OF THE INVENTION

In accordance with the present invention, there is provided an improved animal restraining and training collar for use in combination with a leash or lead which is disposed around an animal's neck.

The collar comprises in combination, a flexible cincture and a separate flexible plastic strip having a plurality of spaced protubances extending therefrom. The cincture is provided with closure means for securing the collar about the neck of the animal in more or less conventional manner. The protuberances extend perpendicularly, unitarily with and from one surface of the plastic strip while the opposite surface of the plastic strip is provided with a plurality of quidinq elements through which the cincture passes and by which the cincture and plastic strip are removably held together. When placed on the animal, the protuberances face toward the neck of the animal, while the entire collar, as a whole, assumes the shape of the neck.

THE DRAWINGS

In order to describe and illustrate the present invention more fully, reference is directed to the accompanying drawings which are to be taken in conjunction with the following detailed description of the invention and in which drawings.

DESCRIPTION OF THE PREFERRED EMBODIMENTS

Figure 1:
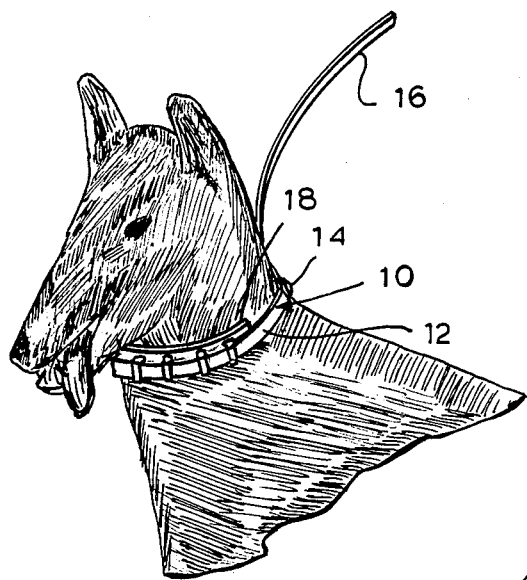
FIG. 1 is a partial view in elevation of an animal with the inventive restraining and training device disposed around its neck.

Referring now more particularly to FIG. 1, the animal restraining and training collar, generally depicted by the numeral 10, employs a cincture 12, or belt of more or less conventional construction sufficiently flexible to be placed about the neck of an animal and secured by a buckle or other fastener 14, in conventional manner, and to which a lead or leash 16 can be attached. Disposed over the cincture 12 is a flexible strip 18 provided with integrally formed and perpendicularly extending protuberances 20.

Figure 3:
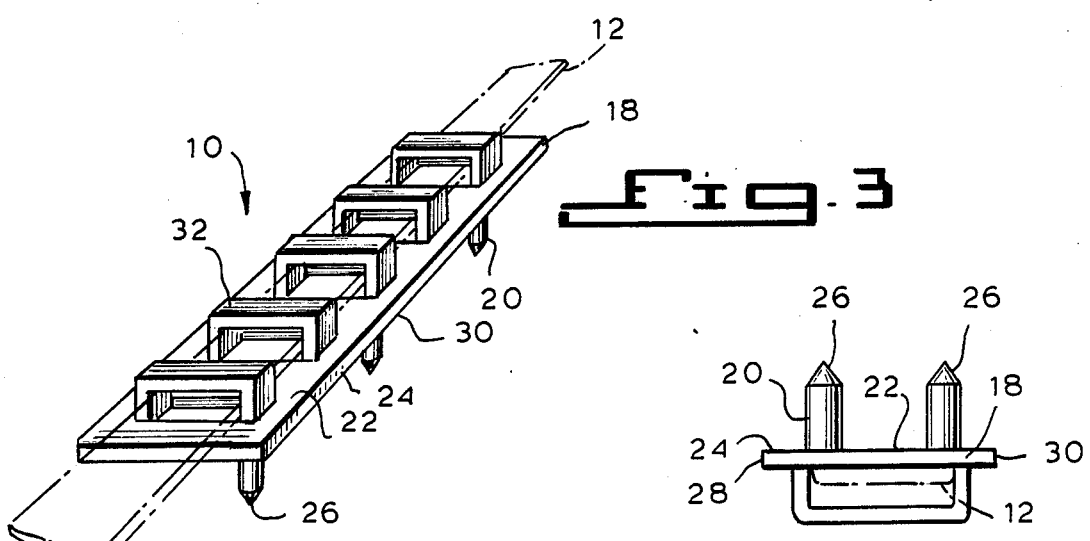
FIG. 3 is a reverse view of the device illustrated in FIG. 2 showing the opposite surface and the disposition of the guiding elements on the strip.
Figure 4:
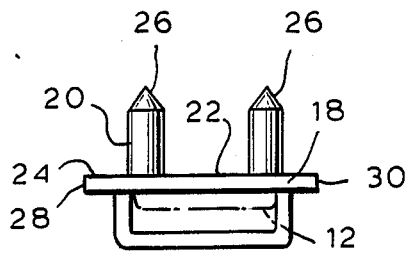
FIG. 4 is an end view of the strip shown in FIG. 2 showing the structure of a guiding element and the disposition of a pair of staggered points in respect thereto.

As may be seen in FIGS. 3 and 4, the strip 18, which may be made of any suitable molded flexible plastic such as polyethylene, polyurethane or polyamide or the like. The strip is generally rigid, but is capable of being bent into an arc so as to fit about the neck of the animal, when the cincture is so disposed. The strip 18 is an elongated flat plate somewhat shorter than the cincture 12 but substantially greater in width, and has two opposing surfaces 22 and 24. The protubrances 20 are located on the inner surface 24 (as seen when the collar is worn by the animal and extends outwardly therefrom. The protuberances are rigid, finger-like members, integrally formed with the strip 18, terminating in points which have rounded ends 26 such as clearly shown in FIG. 4.

The protuberances 20 are arranged in staggered spaced relationship, uniformly in two axially alligned rows, each adjacent one of lateral marginal edges 28 and 30 of the strip 18. Thus, the protuberances 20 along one marginal edge, lie between adjacent pairs of protuberances 20 set along the other marginal edge, and are spaced from each other in each row twice the distance between protuberances, if all the protuberances were aligned along a common axis.

Formed on the front or exposed side 22 of the strip 18 (as normally worn) are means for securing the strip to the cincture 12 in the form of a plurality of loops 32. The loops 32 are uniformly spaced along the length of the strip 18, between the staggered protuberance, so as to be sufficiently close to each other to securely hold the cincture 12 in place when the cincture 12 is threaded through the loops 32. Preferably, the strip 18, together with the protuberances 20 and the loops 32, are molded in an integral manner, at one time. Therefore, the loops 32 are preferably made by displacing the plastic material, from the strip 18 below each loop 32 thereby having, below each loop 32, a conformingly shaped void 34 which similarly lies between each of the protuberances 20, as seen in FIG. 1. These voids 34 facilitate flexing or bending the relatively hard plastic strip 18 about a arc centered on an axis transverse to the length of the strip.

Figure 2:
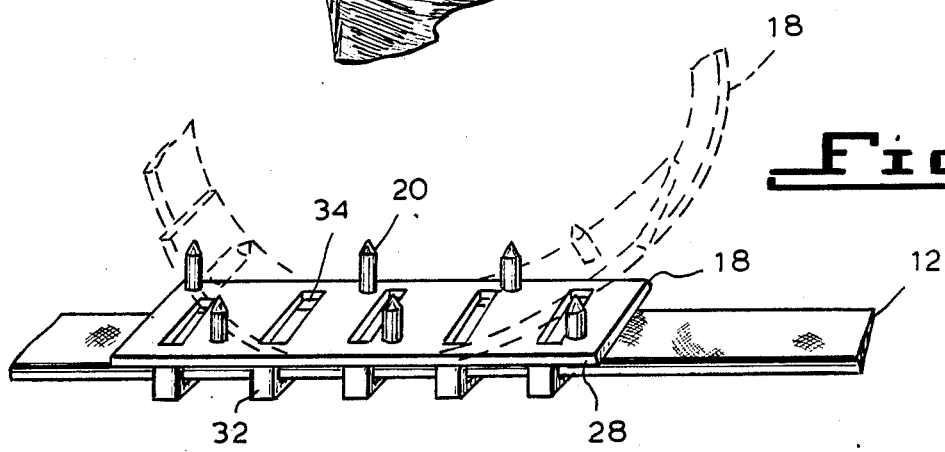
FIG. 2 is a partial plan view of the collar shown in FIG. 1 with the molded, elongated, flexible plastic strip disposed thereon and illustrating the staggered disposition of the points thereon and with the flexibility feature thereof shown in broken lines.

The staggered disposition of the protuberances 20 (in two rows) is advantageous since the axial length between the ends of the strap is shortened to conform to the chord of the arcuately bent strip 18. Thus, when the strap is bent as shown, in broken lines in FIG. 2, the protuberances come closer together, so that each point 26 lies closer to the next adjacent point 26 than otherwise. Thus, when flexed, the strip 18 allows the protuberance 20 to dig into the animal's neck separately and individually to assert a firm pressure on the animal's neck, yet be close enough so that the points 26, in each row co-act with each other to form a pressure line by which the pressure is spread over the length of the strip so that no one point digs so deeply into the animal's skin as to scratch or hurt the animal, such as will occur with known choke collars provided with metal barbs or hooks.

The rounded points 26 on each of the protuberances 20, have the advantage that under no condition can the point itself be sufficiently sharp so that it cuts into the animal's skin. It further permits the entire strip as a whole, to shift about the neck of the animal, under stress or strain, produced by handling the leash yet applying the necessary "choke" pressure on the animal, when the strip 18 is bent in use.

The loops 32 may have a depth (i.e height between the top and the surface of the strip), sufficient to allow varying thickness of cincture to be threaded through. Thus, a single strip 18 may be used for different cinctures or belts, as well as for different animals. On the other hand, the loops may be dimensioned for specific cinctures. Of course, it will be quite clear that the strip 18 and cincture 12 intended to be provided separately and independently, so that the combination can be made by the user himself.

No matter what type of cincture is employed, the strip 18 is arranged so that the points 26 face inwardly around the neck of an animal to perform their restraining and training function. The outer face 22 and the loops 32 perform a decorative function being visible over the cincture 12. The strip can be made in varying sizes and lengths in that it can be readily form collars of different sizes.

The collar formed using the strip of the present invention provides numerous advantages. For example, in use it does not scratch or injure an animal in any way. Yet its function for restraining and training purposes in a firm but gentle manner when force is applied thereto. The strip is made of readily available commercial materials and may be manufactured by known plastic molding and punching techniques. In addition, the strip in combination with a cincture can be left on an animal at all times without chance of loss or any discomfort to the animal, and advantageously perform a decorative function. Still further, since it is made of flexible plastic material, the strip can be bent, yet it will not become distorted or rusty for long periods of use. Numerous other advantages of this invention will be apparent to those skilled in the art.

It is to be understood that numerous variations of the present invention may be made without departing from the spirit and scope of the invention. It is to be understood, therefore, that the present invention is not to be limited to the described embodiment, as set forth in detail hereinabove, except as defined in the appended claims.

What is claimed is:

1. An animal collar comprising a cincture adapted to be removably fastened about the neck of the animal and a bendable strip having two opposed surfaces, said strip having a plurality of outwardly extending protuberances integrally formed on one surface and a plurality of guide elements on the other surface for slidably receiving said cincture, said cincture and strip being positionable about the neck of the animal so that when said cincture is fastened about the neck of the animal, the strip is bent into an arc transverse to its length to conform to the shape of the neck, the outer ends of said protuberances touch said animal and said strip and cincture are movable relatively to each other.

2. The device according to claim 1 wherein the outer ends of the protuberances are rounded.

3. The device according to claim 2 wherein the plurality of protuberances are disposed on the strip in a staggered relationship.

4. The device according to claim 3 wherein the plurality of protuberances are disposed along the length of said strip near the lateral margins of said strip with every other outer end of said plurality of protuberances lying along a common axial line near the same lateral margin of said strip.

5. The device according to claim 4 wherein the distances between consecutive outer ends of the plurality of protuberances is the same and the distance between consecutive protuberances lying along a common axial line near the same lateral margin is twice the distance between consecutive protuberances of said plurality of points.

6. The device according to claim 1, wherein the plurality of protuberances are disposed on the strip in a parallel relationship.

7. The device according to claim 6, wherein the plurality of protuberances are disposed on the strip between the ends thereof and on both sides of the guiding elements located on the other one of the two opposed surfaces of said strip, and in two parallel lines near the lateral margins of said strip.

8. The choke collar according to claim 1, including means for securing the cincture comprising a plurality of loops formed on the side of the strip opposite the protuberances through which said cincture is passed.

9. The collar according to claim 1 including means for fastening said cincture at a fixed length about the neck of the animal.

* * * * *